April 30, 1957     O. H. OTTINGER ET AL     2,790,949
THERMIONIC IONIZATION VACUUM GAUGE Filed May 13, 1954     4 Sheets-Sheet 1

INVENTORS
Oscar H. Ottinger
BY Rasey R. Feezell

ATTORNEY

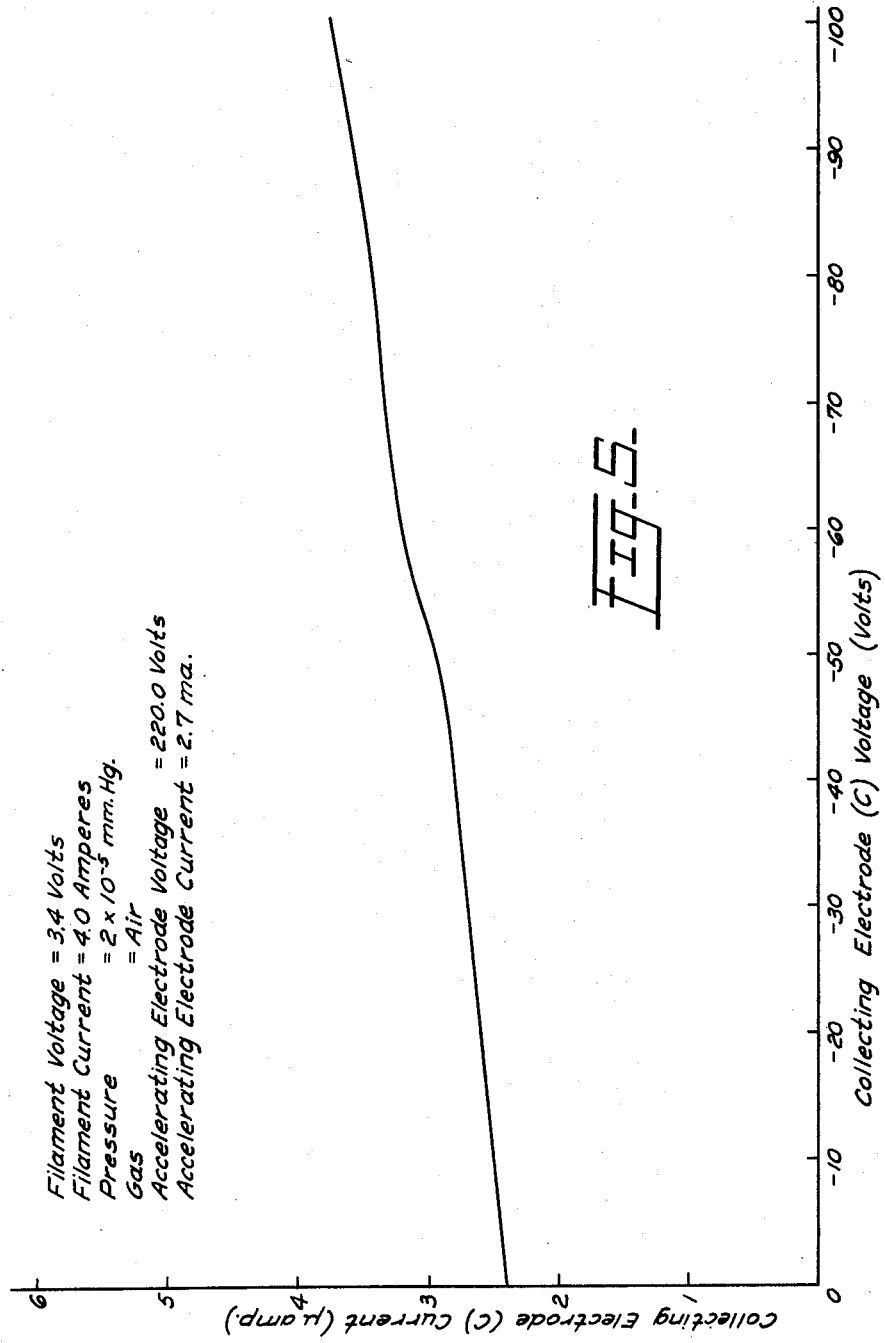

April 30, 1957     O. H. OTTINGER ET AL     2,790,949
THERMIONIC IONIZATION VACUUM GAUGE
Filed May 13, 1954            4 Sheets-Sheet 4
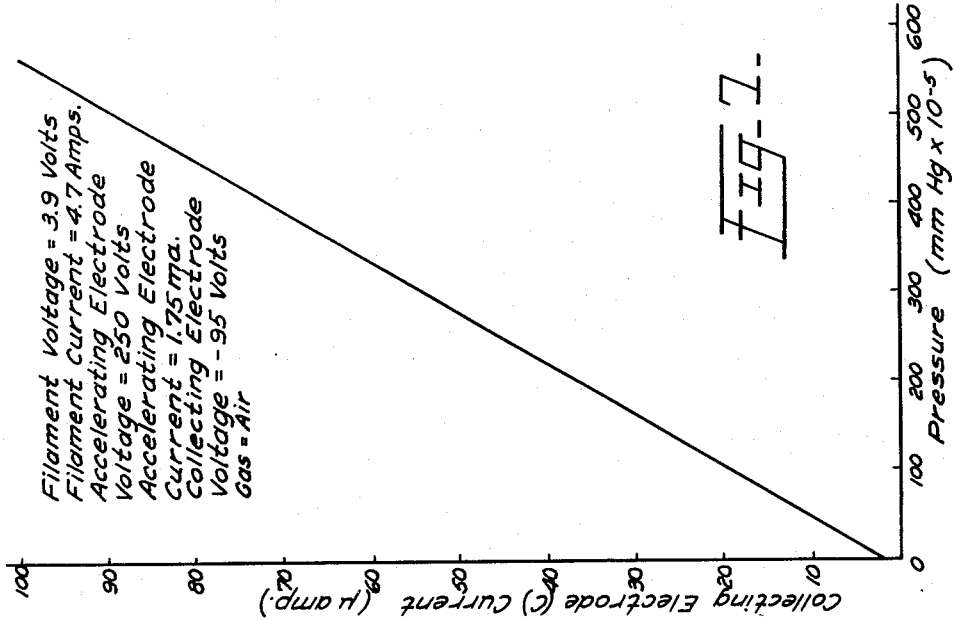
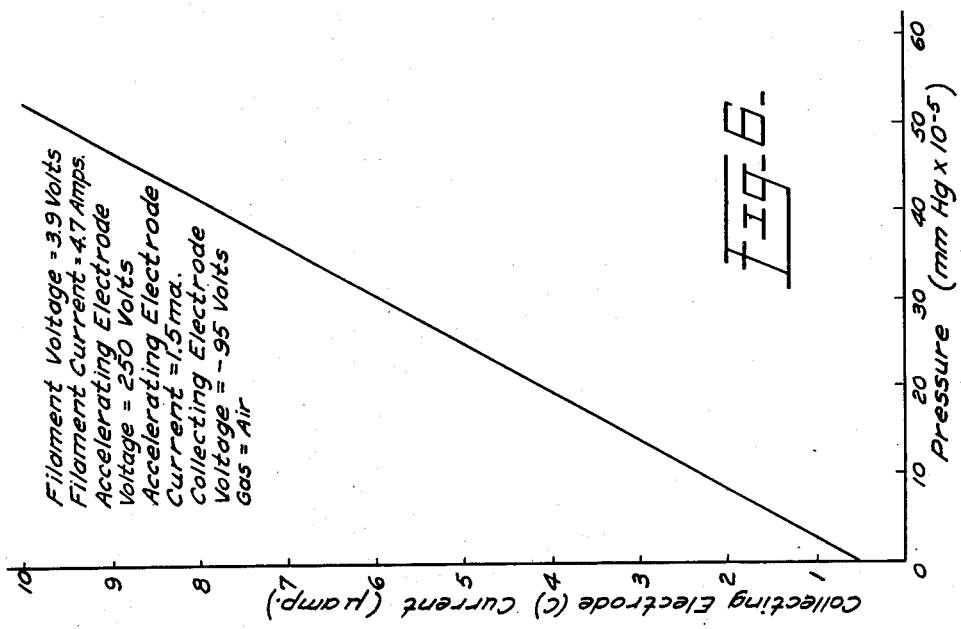
INVENTORS
Oscar H. Ottinger
BY Rasey R. Feezell
Roland A. Anderson
ATTORNEY

United States Patent Office 2,790,949
Patented Apr. 30, 1957

2,790,949

THERMIONIC IONIZATION VACUUM GAUGE

Oscar H. Ottinger and Rasey R. Feezell, Oak Ridge, Tenn., assignors to the United States of America as represented by the United States Atomic Energy Commission Application May 13, 1954, Serial No. 429,711

3 Claims. (Cl. 324—33)

This invention relates generally to improvements in thermionic ionization vacuum gauges of the type described in Vacuum Equipment and Techniques by Guthrie and Wakerling, 1st edition, McGraw-Hill Book Co., Inc., New York, 1949, section 3.8, page 117.

In such thermionic ionization vacuum gauges, a system of three electrodes is operated in the atmosphere the pressure of which it is desired to measure. A thermionic filamentary electrode is energized to emit electrons at a constant rate, and these electrons are drawn at a constant rate to an electron accelerating and collecting electrode maintained at a constant positive potential with respect to the filament. This positive potential electrode is normally referred to in the art as the "grid" electrode, but in this application it will be referred to as the "accelerating" electrode. Positive ions formed by the ionization resulting from this electron flow are drawn to the third electrode which is maintained at a constant negative potential with respect to the filament. This negative potential electrode is normally referred to in the art as the "plate" electrode, but in this application it will be referred to as the "collecting" electrode. Since the electron current is maintained constant, the rate of formation of positive ions, and therefore, the positive ion current to the collecting electrode, constitutes a measure of the pressure of the atmosphere in which the electrode system is operated. This invention is concerned particularly with a novel spatial arrangement and configuration of the three electrodes adapted to provide a unique pattern of electric field throughout the interelectrode region.

It is the most general object of the present invention to provide a thermionic ionization vacuum gauge having generally improved performance characteristics.

Another object of the present invention is to provide a thermionic ionization vacuum gauge having a relative arrangement of electrodes such that a plot of electrode potential is unidirectional in proceeding along a transverse plane from the inner to the outer electrode.

A more specific object of the present invention is to provide a thermionic ionization vacuum gauge characterized by a lower out-gassing factor than similar gauges of the prior art.

It is still another object of the present invention to provide a thermionic ionization vacuum gauge which is more readily fabricated and better adapted to being cleaned than similar gauges of the prior art.

Still another object of the present invention is to provide a thermionic ionization vacuum gauge, as in the preceding objects, which is simple, rugged and cheap.

Other objects and advantages of the present invention will become apparent from the following description when taken in connection with the accompanying drawings.

Figure 5 is another characteristic performance curve of the gauge of the present invention, wherein the positive ion current to the collecting electrode is plotted, as ordinate, against the potential of the collecting electrode, as abscissa; and Figures 6 and 7 are additional performance curves of the gauge of the present invention, wherein the positive ion current to the collecting electrode is plotted, as ordinate, against the absolute pressure in millimeters of the mercury, as abscissa, the two curves covering different pressure ranges.

Figures 1, 2:
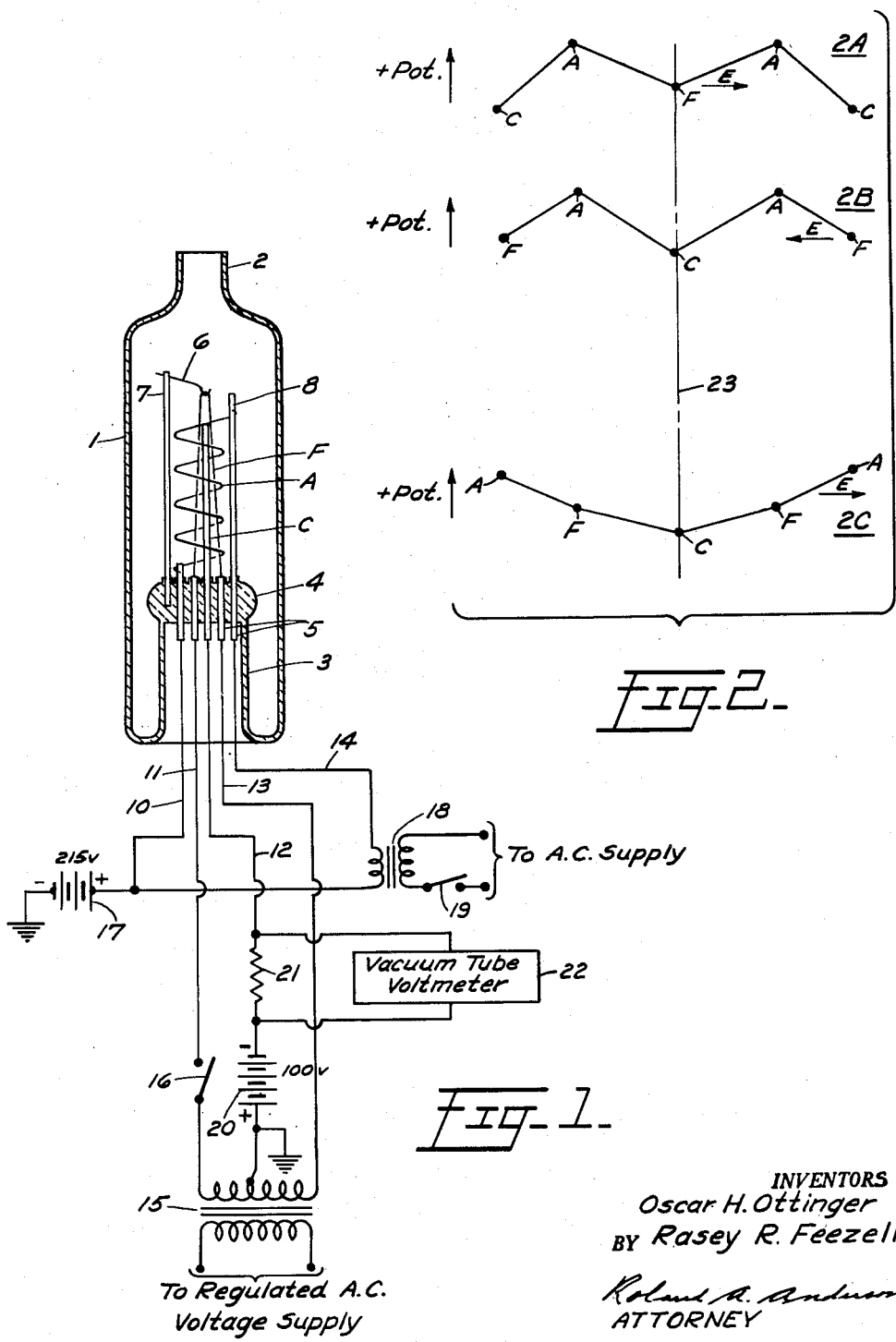
Figure 1 is a central, longitudinal, vertical, sectional view of an embodiment of the improved ionization vacuum gauge of the present invention, together with a simplified wiring diagram of its external circuit.
Figure 2 are plots taken along a horizontal, transverse plane of the potentials of the three electrodes, as these electrodes are spatially arranged in two typical gauges of the prior art (2A and 2B), and as they are arranged in the gauge of the present invention (2C)

Referring now to the detailed embodiment of the present invention shown in Figure 1, reference numeral 1, designates the usual vacuum tight glass envelope having, at its top, the usual open spout portion 2, which is adapted to be connected to the vacuum system the pressure of which it is desired to measure, and the usual tubular re-entrant portion 3 terminating in the bulbous sealed lead-in portion 4. Five lead-in elements 5 extend in sealed relationship through the bulbous portion 4 so that the electrodes within the glass envelope 1 may be electrically connected to the appropriate leads of the external circuit.

The central inner electrode C is preferably formed as a straight upstanding shaft, preferably of tungsten, and it constitutes the positive ion collecting electrode of the present gauge. The filament F of the present gauge is preferably formed in the shape of an upstanding wire hairpin arranged to straddle the collecting electrode C. This filament electrode F is also preferably formed of tungsten and is preferably supported at its top by a small wire hook 6 attached to the top of an upstanding shaft 7 which, in turn, is supported at its bottom by the bulbous portion 4 of the glass envelope 1. The accelerating electrode A preferably takes the form of a wire spiral encircling electrode C and F and coaxial therewith. This accelerating electrode A, which is also preferably formed of tungsten, has its lower end connected to one of the lead-in elements 5 and its upper end connected to a vertical extension 8 of another of the lead-in elements 5.

Referring now to the external circuit, the filament F is maintained at substantially ground potential by having its opposite ends connected, via leads 11 and 13, respectively, to opposite ends of the secondary of transformer 15, the center tap of the secondary being grounded. As shown, the primary of transformer 15 is connected to a regulated A. C. voltage supply, and the secondary of transformer 15 generates a filament voltage of approximately 3.5 volts. The filament circuit contains a switch 16 which is closed during operation, and when so closed, the filament current is about 4.1 amperes.

The accelerating electrode A is maintained at a substantial positive potential with respect to the filament F, preferably about 215 volts, by having its one end connected via lead 10 to the positive terminal of a D. C. supply represented by battery 17, the negative terminal of which is grounded. If desired, the other end of the accelerating electrode A may be connected to the positive terminal of D. C. supply 17 via lead 14 through the secondary of a transformer 18, the primary of which is connected to an A. C. supply. The purpose of this last named A. C. supply and transformer 18 is to permit a flow of current through the accelerating electrode A, when switch 19 in the primary circuit of transformer 18 is closed, for out-gassing purposes.

The collecting electrode C is maintained at a substantial negative potential with respect to the filament F, preferably about 100 volts, by being connected via lead 12 to the negative terminal of a D. C. supply, represented by battery 20, through a high resistance 21. The positive terminal of the D. C. supply 20 is connected to ground, as shown. The resistance 21 is preferably of the order of 1 or 2 megohms, and the voltage drop produced by flow of the positive ion neutralizing current therethrough provides the desired measure of pressure of the atmosphere to which the electrodes are subjected. The voltage drop across resistor 21 may be measured and indicated by any convenient means, as for example, by the vacuum tube voltmeter indicated at 22.

From the foregoing description of the external circuit, it will be apparent that the filament F is maintained at substantially ground potential, the accelerating electrode A is maintained at a substantial positive potential, preferably about 215 volts, and the collecting electrode C is maintained at a somewhat smaller negative potential, preferably about 100 volts.

It will be understood that the external wiring diagram described is overly simplified in order to serve its primary purpose of illustrating the preferred electrode protentials of the present invention, and the relationship and functions of the various electrodes. In practice, of course, a much more sensitive and refined external circuit, such as one similar to that illustrated in Figure 3.8, on page 126, of the aforementioned Vacuum Equipment and Techniques will ordinarily be employed, such circuit providing for the automatic regulation of the D. C. supplies represented by batteries 17 and 20, and also for alteration of the range of the gauge by variation of the ohmic value of resistor 21.

Figure 2 constitutes three plots, taken along a horizontal transverse plane, of the potentials of the three electrodes C, F, A, as these electrodes are spatially arranged in two typical gauges of the prior art (plots 2A and 2B), and as they are spatially arranged according to the principles of the present invention (plot 2C). For the sake of uniformity in comparison, the same potentials are assumed to be applied to the various electrodes as were described with respect to Figure 1, that is, the accelerating electrode A, is maintained at a positive potential of 215 volts with respect to the filament F, and the collecting electrode C is maintained at a negative potential of 100 volts with respect to the filament F, the differences in the plot patterns deriving solely from the differences in the spatial arrangement of the electrodes in the respective gauges. These plots may be considered as plots of electrode potential, as ordinate, against transverse distance from the center line 23, as abscissa.

Plot 2A represents the most conventional type of prior art gauge, exemplified by the model VG1A gauge of Distillation Products, Inc. In such gauge, the filament electrode F is at the center, the accelerating electrode A has an intermediate position, and the collecting electrode C surrounds the other two. Plot 2B represents a somewhat different prior art spatial arrangement of electrodes, wherein the positions of the collecting electrode C and the filament F are reversed from that of the VG1A gauge, this arrangement being used in the Westinghouse Electric Company gauge described in the August 1950 issue of Instruments, at page 800. In this Westinghouse gauge, the collecting electrode C is at the center, the accelerating electrode A has an intermediate position, and the filament F surrounds the other two. Plot 2C represents the gauge of the present invention, wherein the collecting electrode C is at the center, the filament F has an intermediate position, and the accelerating electrode A surrounds the other two.

It will be apparent that in all prior art gauges, as represented by plots 2A and 2B, the filament F, accelerating electrode A, and collecting electrode C are arranged consecutively in the named order, either from the center to the outside, as in plot 2A, or from the outside to the center, as in plot 2B. In both cases, the accelerating electrode A, which is the electrode having the greatest positive potential, occupies an intermediate position between the other two electrodes. In contrast to this, in the case of the present gauge, it will be noted that the electrode which occupies the intermediate position between the other two electrodes, the filament electrode F, is the electrode which also has an intermediate potential between the potentials of the other two electrodes. Thus, as indicated in plot 2C, the electrode potential continuously increases from the center to the outer electrode in the gauge of the present invention, and the reversal of direction which occurs at the intermediate electrode of the gauges of the prior art is absent. The significance of this difference between the electrode potential plots for the gauges of the prior art and for the gauge of the present invention can best be visualized by considering the principles of operation of the gauge in relationship to the direction of the electric field in the interelectrode region between the filament F and the accelerating electrode A which results from the difference of potential between these electrodes. In all three plots, the direction of this electric field, that is, the direction of the force on an electron, in the interelectrode region F-A, is indicated by the arrow labelled "E," and the force on positive ions is, of course, in the opposite direction. In all cases, of course, consistent with the basic operation of the gauge, the force on electrons is in such a direction as to cause the electrons originating at the filament F to proceed to the accelerating electrode A. However, there is a difference with respect to the forces exerted on the positive ions originating in this interelectrode region by ionization resulting from the electron flow. In both prior art gauges illustrated, the force on the positive ions, which results from the difference of potential between the filament F and the accelerating electrode A, is in a direction away from the collecting electrode C, at which electrode the positive ions are desired to be collected. In contrast to this, it will be noted that, in the gauge of the present invention, the force on positive ions originating in the interelectrode region between the filament F and the accelerating electrode A, and resulting from the difference of potential between these two electrodes, is in the direction toward the collecting electrode C, as is most to be desired. While applicants do not purport to fully understand all the complex phenomena involved in the operation of thermionic ionization vacuum gauges, it is believed that the distinction just described between their gauge and prior art gauges constitutes a primary reason for the improvements obtained in the performance characteristics of their gauge.

Figure 3:
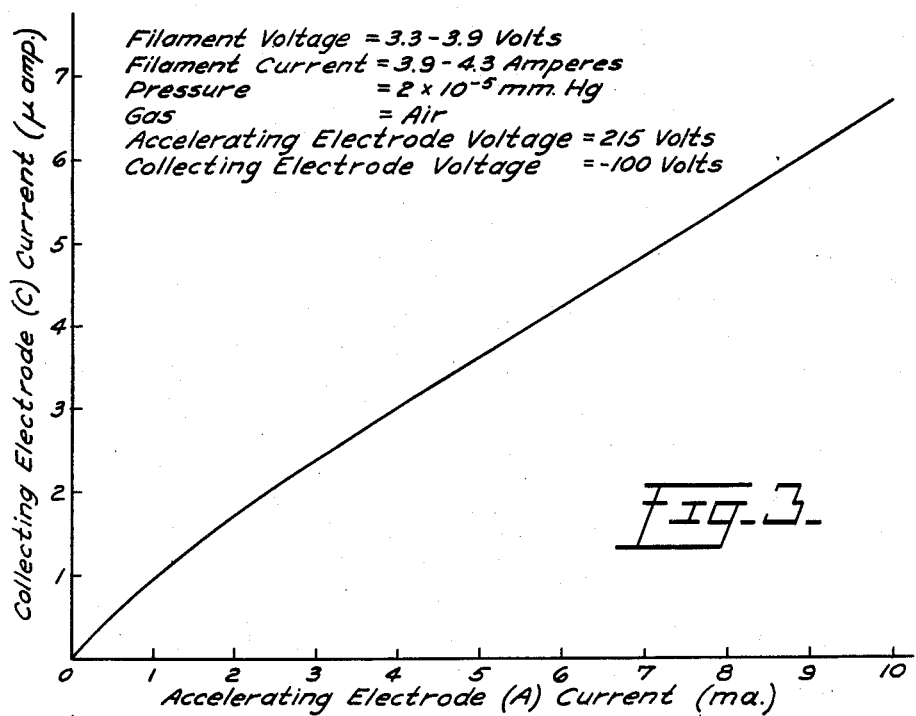
Figure 3 is a characteristic performance curve for the gauge of the present invention, wherein the positive ion current to the collecting electrode is plotted, as ordinate, against the electron current to the accelerating electrode, as abscissa.

Referring now to the curve of Figure 3, the collecting electrode current is plotted, as ordinate, against the accelerating electrode current, as abscissa, the filament voltage and current being varied in the ranges indicated in order to obtain the variation of accelerating electrode current, and the other parameters being maintained constant at the values indicated in the figure. As is known in this art, the slope of this curve represents the sensitivity of the gauge. It is noted that the sensitivity of the present gauge is extremely constant for accelerating electrode currents above about 3 milliamperes.

Figure 4:
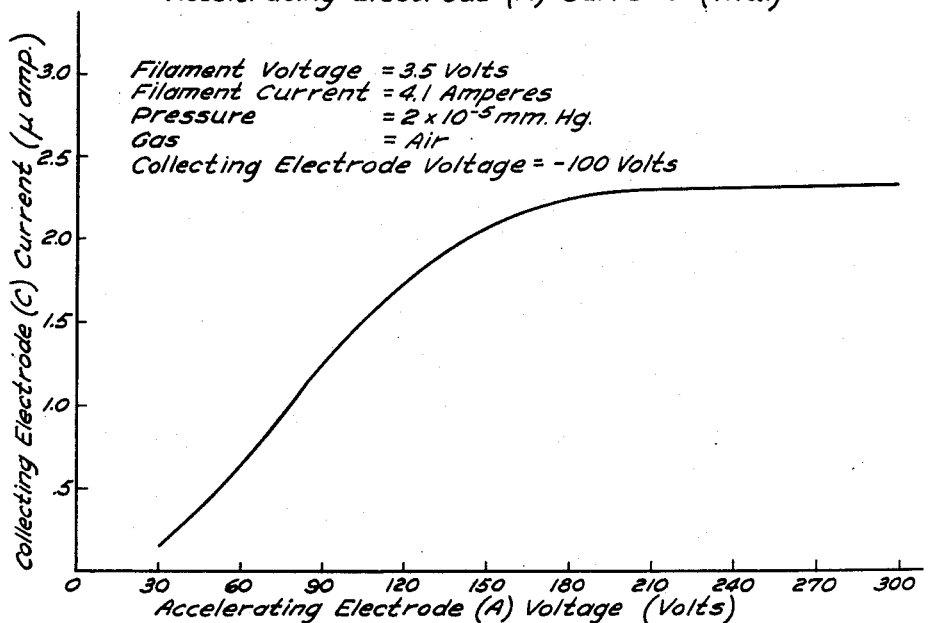
Figure 4 is another characteristic performance curve of the gauge of the present invention, wherein the positive ion current to the collecting electrode is plotted, as ordinate, against the potential of the accelerating electrode, as abscissa.

In the curve of Figure 4, the collecting electrode current is plotted, as ordinate, against the accelerating electrode voltage, as abscissa, all the other parameters, with the exception of the accelerating electrode current, being maintained constant at the values indicated in the figure. From this curve it can be seen that the collecting electrode current is almost completely insensitive to variations of the accelerating electrode voltage when this latter voltage is above about 210 volts. Thus, the regulation requirements for the accelerating electrode voltage are much less severe in the gauge of the present invention than in prior gauges.

Figures 5, 6, and 7 are additional characteristic performance curves for the gauge of the present invention. In Figure 5, the collecting electrode current is plotted, as ordinate, against the collecting electrode voltage, as abscissa, and it will be noted that the curve is fairly flat. In Figures 6 and 7, the collecting electrode current is plotted against the absolute pressure from zero to about $50 \times 10^{-5}$ mm. Hg (in Figure 6) and from zero to about $500 \times 10^{-5}$ mm. Hg (in Fig. 7). Here again it will be noted that the sensitivity, as represented by the slope of the curves, is extremely constant over the entire pressure range plotted.

Several other advantages are derived from the novel configuration and spatial arrangement of the electrodes of the present invention. Thus, the present ionization vacuum gauge may readily be out-gassed simply by closing switch 16 of Figure 1 and thereby energizing and heating up the filament F for a few minutes prior to use. An additional degree of out-gassing may be obtained, if desired, by closing switch 19, and thus energizing and heating up the accelerating electrode A. In contrast to this, the most common thermionic ionization vacuum gauge of the prior art, the VG1A gauge, is out-gassed with considerable difficulty by turning on the filament F and/or the accelerating electrode A, and then simultaneously applying a torch to the glass envelope 1 in the vicinity of the collecting electrode C, which in the VG1A gauge, comprises a cylindrical platinum film disposed on the inner surface of the glass envelope 1, itself. Furthermore, in the present gauge, the configuration and relative positions of the filament F and collecting electrode C are such that, during operation, the filament maintains the collecting electrode at an elevated temperature at all times, thus preventing it from absorbing contaminating gases. An additional advantage of the present gauge over the VG1A gauge is that the collecting electrode C of the VG1A gauge, being formed of a film of platinum, is expensive and easily damaged by cleaning solutions, whereas, the collecting electrode C of the present gauge, being formed merely as a straight shaft of tungsten, is cheap and rugged and relatively impervious to cleaning solutions.

Since many changes could be made in the above construction and many apparently widely different embodiments of this invention could be made without departing from the principles thereof, it is intended that all matter contained in the above description, or shown in the accompanying drawings, shall be interpreted as illustrative and not in a limiting sense.

What is claimed is:

1. In a thermionic ionization vacuum gauge, in combination, three insulated concentric electrodes adapted to be disposed in an atmosphere the pressure of which it is desired to measure, one of said electrodes comprising an inner positive ion collecting electrode, another of said electrodes comprising an intermediate thermionic filamentary cathode electrode, and the third of said electrodes comprising an outer electron accelerating and collecting electrode disposed about said inner and intermediate electrodes, and means for maintaining said intermediate electrode at a positive potential with respect to said inner electrode and at a negative potential with respect to said outer electrode.

2. In a thermionic ionization vacuum gauge, in combination, three axially elongated insulated concentric electrodes adapted to be disposed in an atmosphere the pressure of which it is desired to measure, one of said electrodes comprising a straight inner positive ion collecting electrode, another of said electrodes comprising an intermediate thermionic filamentary cathode electrode in the shape of a hairpin straddling said inner electrode, and the third of said electrodes comprising an outer electron accelerating and collecting electrode in the form of a spiral encircling said inner and intermediate electrodes, and an external circuit for said electrodes comprising regulating means for energizing said intermediate electrode to emit electrons at a constant rate, means for maintaining said outer electrode at a substantial positive potential with respect to said intermediate electrode, means for maintaining said inner electrode at a smaller negative potential with respect to said intermediate electrode, and means for measuring the current flow in the external circuit of said inner electrode.

3. In a thermionic ionization vacuum gauge, in combination, a vacuum tight envelope adapted to be connected to the vacuum system the pressure of which it is desired to measure, three axially elongated insulated concentric electrodes disposed within said envelope, one of said electrodes comprising a straight inner positive ion collecting electrode, another of said electrodes comprising an intermediate thermionic filamentary cathode electrode in the shape of a hairpin straddling said inner electrode, and the third of said electrodes comprising an outer electron accelerating and collecting electrode in the form of a spiral encircling said inner and intermediate electrodes, and an external circuit, including sealed lead-in wires for said electrodes, comprising regulating means for energizing said intermediate electrode to emit electrons at a constant rate, means for maintaining said outer electrode at a substantial positive potential with respect to said intermediate electrode, means for maintaining said inner electrode at a smaller negative potential with respect to said intermediate electrode, and means for measuring the current flow in the external circuit of said inner electrode.

References Cited in the file of this patent

UNITED STATES PATENTS

| | | |
|---|---|---|
| 2,573,005 | Glyptis | Oct. 30, 1951 |
| 2,605,431 | Bayard | July 29, 1952 |